United States Patent

Hwang

[11] Patent Number: 5,857,355
[45] Date of Patent: Jan. 12, 1999

[54] AMMONIA GENERATOR ABSORBER HEAT EXCHANGER CYCLE

[75] Inventor: Dong-Kon Hwang, Seoul, Rep. of Korea

[73] Assignee: LG Electronics Inc., Seoul, Rep. of Korea

[21] Appl. No.: 878,528

[22] Filed: Jun. 19, 1997

[30] Foreign Application Priority Data

Jun. 19, 1996 [KR] Rep. of Korea ............................ 22400

[51] Int. Cl.⁶ .................................................. F25B 15/00
[52] U.S. Cl. ............................................... 62/476; 62/495
[58] Field of Search ............................. 62/101, 476, 495, 62/497

[56] References Cited

U.S. PATENT DOCUMENTS

| | | | |
|---|---|---|---|
| 3,323,323 | 6/1967 | Phillips | 62/497 |
| 3,514,970 | 6/1970 | Eisberg | 62/495 |
| 4,573,330 | 3/1986 | Van Der Sluys et al. | 62/476 |
| 4,706,464 | 11/1987 | Kreutmair | 62/101 |
| 5,033,274 | 7/1991 | Erickson | 62/476 |
| 5,490,393 | 2/1996 | Fuesting et al. | 62/101 |

*Primary Examiner*—William C. Doerrler
*Attorney, Agent, or Firm*—Finnegan, Henderson, Farabow, Garrett & Dunner, L.L.P.

[57] ABSTRACT

An ammonia GAX absorption cycle comprising a first pipe allowing a strong solution generated in an absorber to pass through a rectifier to rectify a coolant vapor provided from a generator the rectifier into a highly concentrated coolant vapor, a second pipe allowing the strong solution flowing in the first pipe and heated in the rectifier flow into a GAX-absorber/generator to undergo heat exchange with a weak solution provided from the generator into the absorber, a third pipe allowing the strong solution enter a solution cooling absorber to undergo heat exchange with the weak solution cooled in the GAX-absorber/generator, and a coolant introducer allowing the strong solution flowing in the second and third pipes and heated by heat exchange to flow into the generator and undergo heat exchange with the coolant vapor and weak solution produced in the generator.

4 Claims, 3 Drawing Sheets

AMMONIA GENERATOR ABSORBER HEAT EXCHANGER CYCLE

BACKGROUND OF THE INVENTION

1. Field of the Invention

The present invention relates to an ammonia GAX (General Absorber Heat Exchanger) absorption cycle.

2. Discussion of Related Art

FIG. 1 is a schematic of a conventional ammonia GAX absorption heating and cooling cycle.

Referring to FIG. 1, the GAX heating and cooling Cycle comprises a generator 10 for heating an $NH_3$-water strong solution to a boiling point to generate ammonia vapor, a rectifier 14 for condensing and rectifying steam contained in an ammonia vapor produced by the generator 10, a condenser 30 for condensing a coolant vapor generated from the rectifier 4 into a liquid coolant, an evaporator 40 for producing cool water by actually vaporizing a coolant, an absorber 20 for absorbing the coolant vapor generated from the evaporator 10, an expansion valve 60 for dropping the pressure of the generator 10 and condenser 30 which are high pressure units, a distributer 24 for uniformly dispersing a weak solution introduced into the absorber 20 through the expansion valve 60, a solution cooling absorber 50 provided in the absorber 20 to make heat exchange between the strong solution transferred from the absorber 20 into the generator 10 and the weak solution produced by the generator 10, an analyzer 13 for allowing the strong solution to flow into the generator 10 via the solution cooling absorber 50 so as to make heat exchange with the coolant vapor produced by the generator 10, a water cooling absorber 21 for permitting the cooling water into the absorber 20 to make heat exchange with the coolant vapor introduced from the evaporator 40 into the absorber 20, a solution pump 70 for jetting the solution out of the low pressure unit, absorber 20 to the high-pressure unit, generator 10, heat-exchangers 12 and 23, a circulation pump 90, a coolant heat-exchanger 50, a weak solution coil 11, and a burner 80.

A typical ammonia GAX absorption cycle basically comprises four constituent units, the generator 10, condenser 30, evaporator 40 and absorber 20.

As shown in FIG. 1, the burner 80 heats a working solution, which is the strong solution produced in the generator 10, to produce a coolant vapor and a weak solution. The coolant vapor moving upward enters the rectifier 14 to make a heat-exchange with cooling water, which is used to eliminate a condensing heat in the condenser 30, whereby a vaporized steam and the coolant vapor are condensed and rectified into a concentrated coolant vapor in the rectifier 14.

The weak solution produced by the generator 10 has a specific gravity larger than that of the strong solution and flows down to the bottom of the generator 10. The weak solution flows in the weak solution coil 11 by means of the pressure difference between a high-pressure unit, i.e., generator 10 and a low-pressure unit, i.e., the absorber 20, being expanded at the expansion valve 60 and flowing into the absorber 20.

The distributer 24 provided at the top of the absorber 20 allows the weak solution to pass into the absorber uniformly.

The concentrated coolant vapor rectified in the rectifier 14 enters the condenser 30 to make heat exchange with cooling water. A liquid coolant generated as such passes through the expansion valve 60 to the evaporator 40 heated, where heat exchange occurs between the liquid coolant and the cooling water to generate the coolant vapor again.

The coolant vapor vaporized in the evaporizer 40 flows into the coolant heat exchanger 50 to undergo heat exchange with the liquid coolant condensed in the condenser 30. The liquid coolant is cooled nearly to a vaporization temperature in the evaporizer 40, but coolant vapor is heated up to a saturation temperature of the absorber 20, thereby accelerating the absorption and efficiently vaporizing a small amount of the coolant which is not completely vaporized in the evaporizer 40.

The coolant vapor vaporized in the evaporizer 40 undergoes heat exchange in the coolant heat exchanger 50 and flows into the absorber 20. It is then absorbed by the weak solution produced in the generator 10, so that the weak solution is converted into a strong solution as thick as the original strong solution in the generator 10.

The removal of heat is required to accelerate the absorption of the coolant vapor into the strong solution. To eliminate the heat, the coolant vapor from the evaporizer 40 is absorbed by the solution flowing downward in a solution cooling absorber 22, and the heat of absorption generated as such is exchanged in the water cooling absorber 21. The pumping of the solution pump 70 generates the strong solution in the absorber 20 and the strong solution enters the generator 10. Flowing in the solution cooling absorber 22 provided within the absorber 20, the strong solution undergoes heat exchange with the water cooling absorber 21. Thus, the weak solution in the absorber 20 bore efficiently absorbs the coolant vapor flowing upward the water cooling absorber 21 to generate the strong solution in the absorber 20.

Through the pumping of the solution pump 70, the strong solution generated in the absorber 20 flows through the solution cooling absorber 22, and enters the analyzer 13 formed in the absorber 20 to have heat exchange with the coolant vapor produced in the generator 10.

To remove heat, the cooling water is heated in the water cooling absorber 21, but cooled again with a fan.

During the cooling, an indoor air is supplied with cooling water cooled in the evaporizer 40. The cooling water cools the condenser 30 and the absorber 20 and the cooling water heated thereby is exhausted to outdoor air so as to be cooled again.

Unlikely, during the heating the hot water passing through the condenser 30 and the absorber 20 is transferred to the indoor air. The outdoor air is supplied with the cooling water passing through the evaporizer 40.

The working fluid in the heat exchanger 23 formed in the top of the absorber 20 is produced in the generator 10 and gets heated during the heat exchange with the heated weak solution in the absorber 20. The working fluid is circulated by the circulation pump 90, and enters the heat exchanger 12 formed in the generator 10 to undergo heat exchange with the strong solution flowing from the solution cooling absorber 22 of the absorber 20 to the analyzer 13 of the generator 10. The strong solution is thus heated.

To transfer heat from the absorber 20 to the generator 10, the conventional ammonia GAX absorption cycle is required to use a separate heat transfer fluid instead of the working fluid and additionally a separate heat transfer circuit to carry the fluid. The heat transfer circuit must be a closed circuit comprising an expansion chamber (not shown) to absorb the thermal expansion and contraction according to the temperature of the heat transfer fluid. A circulation pump 90 is required to give a compulsory circulation of the heat transfer fluid. This cycle is to transfer only the line heat of the absorber 20 to the generator 10.

As described above, the conventional GAX cycle is very expensive to operate because it has to be provided with a separate heat transfer circuit, heat transfer fluid, expansion tank, circulation pump and the like. Furthermore, it uses only the line heat, but cannot expect a considerable improvement in the coefficient of performance against the cost.

SUMMARY OF THE INVENTION

Accordingly, the present invention is directed to an ammonia GAX absorption cycle that substantially obviates one or more of the problems due to limitations and disadvantages of the related art.

For example, an ammonia GAX absorption cycle of the present invention, as embodied herein, makes heat transfer from a hot unit in an absorber to a cold unit in a generator and rectifies a coolant vapor generated in the generator with a strong solution formed in the absorber, thereby promoting the COP (Coefficient of performance) of the cycle and simplifying its construction.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an ammonia GAX absorption cycle comprises a generator for providing a coolant vapor and a weak solution; a rectifier for providing heat exchange between a strong solution and the coolant vapor to produce a heated strong solution; and an absorber for providing heat exchange between the heated strong solution and the weak solution to produce the strong solution.

According to another aspect of the present invention, as embodied herein, an ammonia GAX absorption cycle comprises a first pipe which passes a strong solution generated in an absorber through a rectifier so as to rectify a coolant vapor, which is provided from a generator into the rectifier, into a highly concentrated coolant vapor; a second pipe which passes the strong solution passed from the first pipe to the absorber to provide heat exchange with a weak solution provided from the generator into the absorber; a third pipe which passes at least part of the strong solution to the absorber to provide heat exchange with the weak solution; and a means for combining the strong solution passed from the second and third pipes to the generator to provide heat exchange with the coolant vapor and the weak solution.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENTS

Reference will now be in detail to the preferred embodiments of the present invention, examples of which are illustrated in the accompanying drawings.

Figure 1:
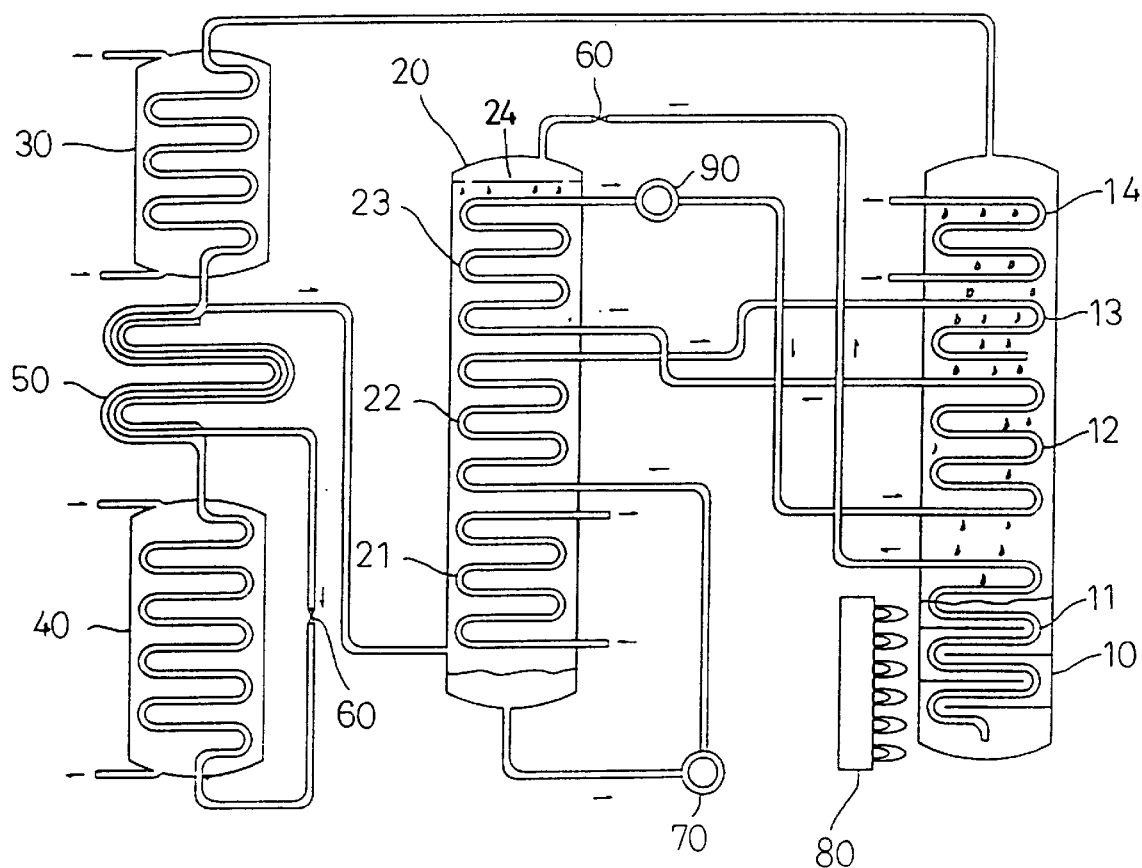
FIG. 1 is a schematic of a conventional ammonia GAX absorption cycle.
Figure 2:
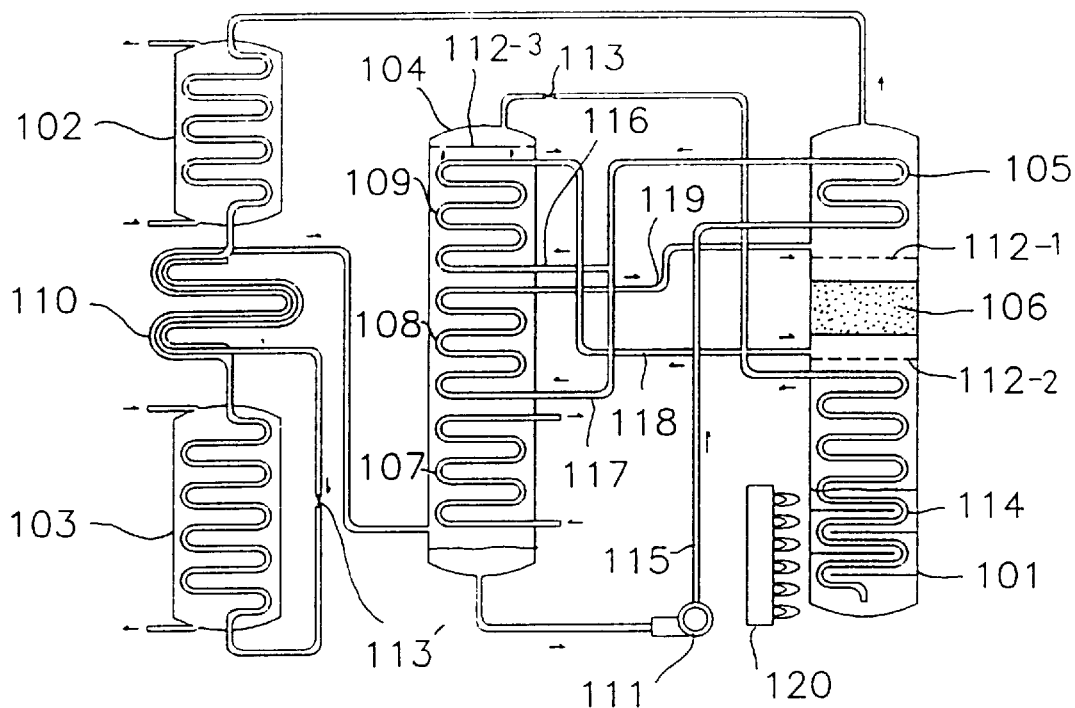
FIG. 2 is a schematic of an ammonia GAX absorption cycle of an embodiment of the present invention.

FIG. 2 is a schematic of an ammonia GAX absorption cycle and its peripheral devices according to the present invention.

Referring to FIG. 2, the ammonia GAX absorption cycle, as embodied herein, comprises a generator 101 for boiling a coolant, i.e., preferably ammonia in a concentrated aqueous ammonia solution (strong solution), by using a burner 120 to produce an ammonia coolant vapor and a diluted aqueous ammonia solution (weak solution); a rectifier 105 for condensing steam contained in the ammonia vapor to rectify it into a highly concentrated ammonia coolant vapor; a condenser 102 for condensing the coolant vapor flowing from the generator 101 into a liquid coolant, by using cooling water cooled by outdoor air; an evaporizer 103 for vaporizing the liquid coolant condensed in the condenser 102 into a coolant vapor again, by the cooling water heated by indoor air during the cooling; an expansion valve 113' for expanding the liquid coolant flowing from the condenser 102 to the evaporizer 103; a coolant heat exchanger 110 allowing heat exchange between the liquid coolant condensed in the condenser 102 and the coolant vapor vaporized in the evaporizer 103; an absorber 104 permitting the weak solution transferred from the generator 101 to absorb the coolant vapor vaporized in the evaporizer 103 and thereby produce a strong solution as thick as the strong solution initially generated in the generator 101; a weak solution coil 114 formed in the generator 101 to transfer the weak solution produced in the generator 101 to the absorber 104; an expansion valve 113 for expanding the weak solution flowing from the generator 101 into the absorber 104; a distributer 112-3 formed in the top of the absorber 104 so as to allow the weak solution expanded by the expansion valve 113 to flow uniformly in the absorber 104; a solution pump 111 for pumping the strong solution generated in the absorber 104 towards the generator 101; a first pipe 115 allowing the strong solution generated in the absorber to pass through the rectifier 105 by means of a pumping of the solution pump 111 and have heat exchange with the coolant vapor in the rectifier 105 so as to rectify the coolant vapor into a highly concentrated coolant vapor; a second pipe 116 allowing part of the strong solution flowing in the first pipe 115 and heated by heat exchange in the rectifier 105 to enter the absorber 104; a GAX absorber/generator 109 formed in the absorber 104 to have heat exchange occur between the strong solution flowing in the second pipe 116 and the weak solution flowing from the generator 101 into the absorber 104; a third pipe 117 allowing the strong solution flowing in the first pipe 115 and heated by the heat exchange in the rectifier 105 to go into the absorber 104; a solution cooling absorber 108 formed in the absorber 104 to have heat exchange occur between the strong solution flowing in the third pipe 117 and the weak solution cooled by the heat exchange in the GAX-absorber/generator 109; a water cooling absorber 107 formed in the bottom of the absorber 104 to have a cold water flow undergo heat exchange with an ascending coolant vapor flowing from the evaporizer 103 into the absorber 104; a fourth pipe 118 allowing the strong solution flowing in the second pipe 116 and heated through heat exchange in the GAX-absorber/generator 109 to enter the bottom of an analyzer 106 in the generator 101 and have heat exchange with the weak solution produced in the generator 101; a distributer 112-2 for uniformly distributing the strong solution entering the generator 101 through the fourth pipe 118; a fifth pipe 119 allowing the strong solution flowing in the third pipe 117 and heated by heat exchange in the solution cooling absorber 108 to enter the top of the analyzer 106 in the generator 101 and absorb part of steam contained in the coolant vapor produced in the generator 101; and a distributer 112-1 allowing the strong solution entering the generator 101 through the fifth pipe 119 to flow uniformly in the generator 101.

The ammonia GAX absorption cycle of the present invention has working conditions under a constant pressure and a solution fluid to produce an utmost effective coolant under variances in the combinations of elements and thereby enhancing the performance of the cycle. The ammonia GAX absorption cycle of the present invention, as embodied herein, basically comprises four constituent units, the generator 101, condenser 102, evaporizer 103 and absorber 104.

As shown in FIG. 2, the burner 120 heats the working solution, i.e., a strong solution contained in the generator 101 to produce a coolant vapor and a weak solution. The coolant vapor flows upward, and enters the rectifier 105 through the analyzer 106.

The coolant vapor in the rectifier 105 flows in the first pipe 115 by a pumping of the solution pump 111 to have heat exchange with the strong solution generated in the absorber 104 and flowing into the rectifier 105. The steam contained the coolant vapor is condensed through heat exchange between the coolant vapor and the strong solution in the rectifier, thereby rectifying the coolant vapor into a highly concentrated coolant vapor.

The weak solution produced in the generator 101 has a specific gravity larger than that of the strong solution, and thus flows down to the bottom of the generator 101. It flows in the weak solution coil 114 by means of a pressure difference between a high-pressure unit, i.e., the generator 101 and a low-pressure unit, i.e., the absorber 104.

The weak solution flowing in the weak solution coil 114 is expanded in the expansion valve 113 and flows into the absorber 104. Falling in drops on the distributer 112-3 formed in the top of the absorber 104, the weak solution I$ distributed uniformly in the absorber 104 by the distributer 112-3.

The highly concentrated coolant vapor which is rectified in the rectifier 105 flows into the condenser 102 to have heat exchange with the cooling water in the condenser 102. The cooling water in the condenser 102 absorbs the heat of condensation generated while the coolant vapor is condensed into the liquid coolant.

The liquid coolant condensed in the condenser 102 is expanded in the expansion valve 113'. After the pressure drops to a saturated vapor pressure between 4 and 6 bar, the liquid coolant flows into the evaporizer 103 and vaporizes into a coolant vapor again through heat exchange with the cooling water. The cooling water is cooled by the latent heat of vaporization to cool the indoor air.

The coolant vapor vaporized in the evaporizer 103 enters the coolant heat exchanger 101 to have heat exchange with a liquid coolant condensed in the condenser 102. The liquid coolant is then cooled down nearly to a vaporizing temperature in the evaporizer 103. The coolant vapor is heated up to a saturating temperature of the absorber 104. This accelerates the absorption and efficiently vaporizes even a small amount of the coolant that is not completely vaporized in the evaporizer 103.

After the heat exchange in the coolant heat exchanged 110, the coolant vapor vaporized in the evaporizer 103 flows into he absorber 104. The coolant vapor heated in the absorber 104 is cooled in the water cooling absorber 107 through a heat exchange with the cooling water and absorbed by the weak solution produced in the generator 101, and flows into the absorber 104. The weak solution is then converted into a strong solution as thick as the strong solution originally produced in the generator 101.

The strong solution flowing in the GAX-absorber/generator 109 and the solution cooling absorber 108 is heated by the heat absorption generated when the weak solution absorbs the coolant vapor in the absorber 104.

The strong solution produced in the absorber 104 gathers in the bottom of the absorber 104 and flows into the high-pressure unit, generator 101 by the operation of the solution pump 111. Passing through the first pipe 115, the strong solution enters the rectifier 105 to have heat exchange with the coolant vapor produced in the generator 101, thereby condensing the steam contained in the coolant vapor and rectifying it into a highly concentrated coolant vapor.

The strong solution is heated by the latent heat of condensation of the coolant vapor and the line heat which is the temperature difference between the strong solution and coolant vapor.

It is then divided into the second and third pipes 116 and 117, flowing into the GAX-absorber/generator 109 and the solution cooling absorber 108, respectively.

In the GAX-absorber/generator 109, the strong solution undergoes heat exchange with the weak solution flowing into the top of the absorber 104 through the weak solution coil 114 and absorbs the latent heat.

The strong solution heated in the GAX-absorber/generator 109 passes through the fourth pipe 118 in a liquid-to-vapor transition state, and enters the bottom of the analyzer 106 which is a medium temperature unit. The distributer 112-2 permits the strong solution to flow uniformly in the generator 101. The strong solution undergoes heat exchange with the weak solution produced in the generator 101 and flows in the weak solution coil 114 and descends in the generator 101.

The strong solution enters the solution cooling absorber 108 through the third pipe 117 and absorbs heat from the weak solution cooled by the GAX-absorber/generator 109. The strong solution heated as such enters the top of the analyzer 106 in the generator 101 through the fifth pipe 119 and flows uniformly in the generator 101 with the help of the distributer 112-1.

The strong solution uniformly distributes in the generator 101 and absorbs part of the steam contained in the coolant vapor produced in the generator 101, so that it is cooled by heat exchange and moves down in the generator 101.

When carrying out the cooling, the ammonia GAX absorption cycle supplies the cooling water cooled in the evaporizer 103 to indoor air. The cooling water is heated by heat exchange with the heat of the condenser 102 and absorber 104 and cooled again in the outdoor air.

To the contrary, during the heating the hot water passing through the condenser 102 and absorber 104 is transferred to the indoor air. The outdoor air is supplied with the cooling water that passed the evaporizer 103.

A succession of such operations as described above cycles in a state of equilibrium during the operation of the system.

Figure 3:
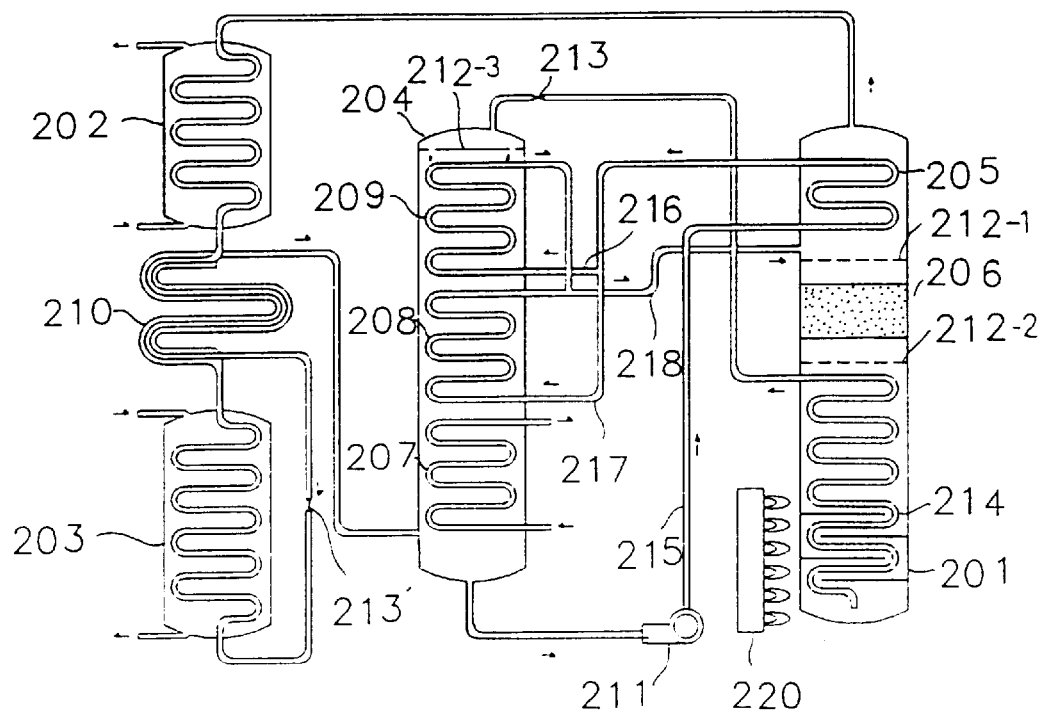
FIG. 3 is a schematic of an ammonia GAX absorption cycle in accordance with a preferred embodiment of the present invention.

FIG. 3 is a schematic of an ammonia GAX absorption cycle according to a first preferred embodiment of the present invention.

Referring to FIG. 3, the ammonia GAX absorption cycle comprises a generator 201 for boiling a coolant, i.e., ammonia in a concentrated aqueous ammonia solution (strong solution) by using a burner 220 to produce an ammonia coolant vapor and a diluted aqueous ammonia solution (weak solution); a rectifier 205 for condensing the water vaporized with the coolant vapor produced in the generator 201 to rectify it into a highly concentrated ammonia coolant vapor, a condenser 202 for condensing the coolant vapor blowing from the generator 201 into a liquid coolant by using cooling water cooled by outdoor air; an evaporizer 203 for vaporizing the liquid coolant condensed in the condenser 202 into a coolant vapor again by the cooling water heated by indoor air during cooling; an expansion valve 213 for expanding the liquid coolant flowing from the condenser 202 to the evaporizer. 203; a coolant heat exchanger 210 allowing heat exchange between the liquid coolant condensed in the condenser 202 and the coolant vapor vaporized in the evaporizer 203; an absorber 204 permitting the weak solution transferred from the generator 201 to absorb the coolant vapor vaporized in the evaporizer 203, thereby producing a strong solution as thick as the strong solution initially generated in the generator 201, a weak solution coil 214 formed in the generator 201 to transfer the weak solution produced in the generator 201 to the absorber 204; the expansion valve 213 for expanding the weak solution flowing from the generator 201 into the absorber 204; a distributer 212-3 formed in the top of the absorber 204 so as to allow the weak solution expanded by the expansion valve 213 to flow uniformly in the absorber 204; a solution pump 211 for pumping the strong solution generated in the absorber 204 towards the generator 201; a first pipe 215 allowing the strong solution generated in the absorber to pass through the rectifier 205 by means of a pumping of the solution pump 211 and have heat exchange with the coolant vapor in the rectifier 205 so as to rectify the coolant vapor into a highly concentrated coolant vapor; a second pipe 216 allowing part of the strong solution flowing in the first pipe 215 and heated by the heat exchange in the rectifier 205 to enter the absorber 204, a GAX-absorber/generator 209 formed in the absorber 204 to have a heat exchange occur between the strong solution flowing in the second pipe 216 and the weak solution flowing from the generator 201 into the absorber 204; a third pipe 217 allowing the strong solution flowing in the first pipe 215 and heated by the heat exchange in the rectifier 205 to go into the absorber 204; a solution cooling absorber 208 formed in the absorber 204 to have heat exchange occur between the strong solution flowing in the third pipe 217 an the weak solution cooled by the heat exchange in the GAX-absorber/generator 209; a water cooling absorber 207 formed in the bottom of the absorber 204 to have cold water flow undergo heat exchange with the ascending coolant vapor-flowing from the evaporizer 203 into the absorber 204; a fourth pipe 218 for combining the strong solution flowing in the second pipe 216 and heated by the heat exchange in the GAX-absorber/generator 209 with that flowing in the third pipe 217 and heated by the heat exchange in the solution cooling absorber 208, to absorb part of steam contained in the coolant vapor produced in the generator 201 and partly rectify the steam; the strong solution entering the top of analyzer 206 in the generator 201 for the purpose of heat exchange with the weak solution produced in the generator 201; a distributer 212-1 for uniformly distributing the strong solution entering the generator 201 through the fourth pipe 218, and a distributer 212-2 for uniformly distributing the strong solution passing through the analyzer 206 after dispersal by the distributer 212-1 to cause the bottom of the analyzer 206 to have active heat exchange between the strong solution and the weak solution produced in the generator 201 and flowing in the weak solution coil 214.

The ammonia GAX absorption cycle basically comprises four constituent units, the generator 201, condenser 202, evaporizer 203 and absorber 204.

As shown in FIG. 3, the burner 220 heats the working solution, i.e., a strong solution contained in the generator 201 to produce a coolant vapor and a weak solution. The coolant vapor flows upward and enters the rectifier 205 through the analyzer 206.

The coolant vapor in the rectifier 205 flows in the first pipe 215 by pumping the solution pump 211 to have heat exchange with the strong solution generated in the absorber 204 and flowing into the rectifier 205. Steam contained the coolant vapor is condensed through heat exchange between the coolant vapor and the strong solution in the rectifier thereby rectifying the coolant vapor into highly concentrated coolant vapor.

The weak solution produced in the generator 201 has a specific gravity larger than that of the strong solution, and thus flows down to the bottom of the generator 201. It flows in the weak solution coil 214 by means of a pressure difference between a high-pressure unit, i.e., the generator 201 and a low-pressure unit, i.e., the absorber 204.

The weak solution flowing in the weak solution coil 214 is expanded in the expansion valve 213 and flows into the absorber 204. Falling in drops on the distributer 212-3 formed in the top of the absorber 204, the weak solution is distributed uniformly in the absorber 204 by the distributer 212-3.

The highly concentrated coolant vapor rectified in the rectifier 205 flows into the condenser 202 to have heat exchange with the cooling water flowing from the outdoor air into the condenser 202. The cooling water in the condenser 202 absorbs the heat of condensation generated during the condensation of the coolant vapor in the condenser 202.

The liquid coolant condensed in the condenser 202 is expanded in the expansion valve 213'. After the pressure drops to a saturated vapor pressure between 4 and 6 bar, the liquid coolant flows into the evaporizer 203 and vaporizes into a coolant vapor again through heat exchange with the cooling water. The cooling water is cooled by a latent heat of vaporization to cool the indoor air.

The coolant vapor vaporized in the evaporizer 203 enters the coolant heat exchanger 210 to have heat exchange with a liquid coolant condensed in the condenser 202. The liquid coolant is then cooled down nearly to a vaporizing temperature in the evaporizer 203. The coolant vapor is heated up to a saturating temperature of the absorber 204. This accelerates the absorption and efficiently vaporizes even a small amount of the coolant that is not completely vaporized in the evaporizer 203.

After the heat exchange in the coolant heat exchanger 210, the coolant vapor vaporized in the evaporizer 203 flows into the absorber 204. The coolant vapor heated in the absorber 204 is cooled in the water cooling absorber 207 through a heat exchange with the cooling water and absorbed by the weak solution produced in the generator 201 and flowing into the absorber 204. The weak solution is then converted into a strong solution as thick as the strong solution originally produced in the generator 201.

The strong solution flowing in the GAX-absorber/ generator 209 and the solution cooling absorber 208 is heated by the heat of absorption generated when the weak solution absorbs the coolant vapor in the absorber 204.

The strong solution produced in the absorber 204 gathers in the bottom of the absorber 204 and flows into the high pressure unit, generator 201 by the operation of the solution pump 211. Passing through the first pipe 215, the strong solution enters the rectifier 205 to have heat exchange with the coolant vapor produced in the generator 201, thereby condensing the steam contained in the coolant vapor and rectifying it into a highly concentrated coolant vapor.

The strong solution is heated by the latent heat of condensation of the coolant vapor and the line heat which is the temperature difference between the strong solution and coolant vapor.

It is then divided into the second and third pipes 216 and 217, flowing into the GAX-absorber/generator 209 and the solution cooling absorber 200, respectively.

The strong solution flowing into the solution cooling absorber 208 through the third pipe 217 is heated by a heat exchange with the weak solution cooled in the GAX-absorber/generator 209.

The strong solution produced in the absorber 204 gathers in the bottom of the absorber 204 and flows into the high-pressure unit, generator 201 by the operation of the solution pump 211. Passing through the first pipe 215, the strong solution enters the rectifier 205 to have heat exchange with the coolant vapor produced in the generator 201, thereby condensing the steam contained in the coolant vapor and rectifying it into a highly concentrated coolant vapor.

The strong solution is heated by the latent heat of condensation of the coolant vapor and the line heat which is the temperature difference between the strong solution and coolant vapor.

It is then divided into the second and third pipes 216 and 217, flowing into the GAX-absorber/generator 209 and solution cooling absorber 208, respectively.

Part of the strong solution flowing into the GAX-absorber/generator 209 through the second pipe 216 is boiled by absorbing the latent heat through heat exchange with the weak solution produced in the generator 201 and flowing into the top of the absorber 204 through the weak solution coil 214.

The strong solution entering the solution cooling absorber 208 through the third pipe 217 absorbs heat from the weak solution that is cooled by the GAX-absorber/generator 209.

Flowing through the GAX-absorber/generator 209 and solution cooling absorber 208, the strong solution undergoes heat exchange with the weak solution in the absorber 204 and gets in a liquid-to-gas transition state. The strong solutions flowing in the GAX-absorber/generator 209 combines with that in the solution cooling absorber 208. The combined strong solution passes through the fourth pipe 218.

Flowing the fourth pipe 218, the strong solution enters the top of the analyzer 206 in the generator 201 and uniformly flows in the generator 201 by means of the distributer 212-1 formed at the top of the analyzer 206. It absorbs part of the steam contained in the coolant vapor ascending in the generator 201 to have heat exchange with part of the coolant vapor and fall in a drop on the distributer 212-2 through the analyzer 206.

The strong solution dropped on the distributer 212-2 is dispersed in the generator 201 and undergoes heat exchange with the weak solution produced in the generator 201 that flows in the weak solution coil 214. It then ascends at the bottom of the generator 201.

A succession of such operations as described above cycles in a state of equilibrium during the operation of the system.

Figure 4:
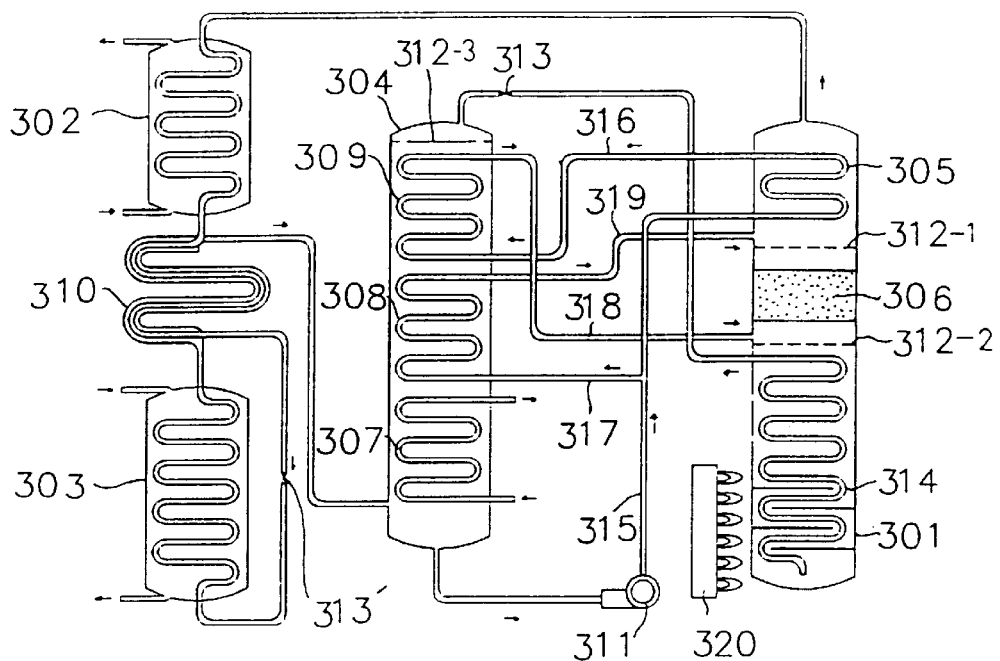
FIG. 4 is a schematic of an ammonia GAX absorption cycle in accordance with another preferred embodiment of the present invention.

FIG. 4 is a schematic of an ammonia GAX absorption cycle according to a second preferred embodiment of the present invention.

Referring to FIG. 4 the ammonia GAX absorption cycle comprises a generator 301 for boiling a coolant, i.e., ammonia in a concentrated aqueous ammonia solution (strong solution) by using 8 burner 320 to produce an ammonia coolant vapor and a diluted aqueous ammonia solution (weak solution); a rectifier 305 for condensing the water vaporized with the coolant vapor produced in the generator 301 to rectify it into a highly concentrated ammonia coolant vapor; a condenser 302 for condensing the coolant vapor flowing from the generator 301 into a liquid coolant by using the cooling water cooled by an outdoor air; an evaporizer 303 for vaporizing the liquid coolant condensed in the condenser 302 into a coolant vapor again by the cooling water heated by an indoor air during a cooling an expansion valve 313' for expanding the liquid coolant flowing from the condenser 302 to the evaporizer 303, a coolant heat exchanger 310 allowing heat exchange between the liquid coolant condensed in the condenser 302 and the coolant vapor vaporized in the evaporizer 303; an absorber 304 permitting the weak solution transferred from the generator 301 to absorb the coolant vapor vaporized in the evaporizer 303, thereby producing a strong solution as thick as the strong solution initially generated in the generator 301, a weak solution coil 314 formed in the generator 301 to transfer the weak solution produced in the generator 301 to the absorber 304; an expansion valve 313 for expanding the weak solution flowing from the generator 301 into the absorber 304; a distributer 312-3 formed in the top of the absorber 304 so as to allow the weak solution expanded by the expansion valve 313 to flow uniformly in the absorber 304; a solution pump 31 for pumping the strong solution generated in the absorber 304 towards the generator 301; a first pipe 315 allowing the strong solution generated in the absorber to pass through the rectifier 305 by pumping the solution pump 311 and have heat exchange with the coolant vapor in the rectifier 305 so as to rectify the coolant vapor into a highly concentrated coolant vapor; a second pipe 316 allowing part of the strong solution flowing in the first pipe 315 and heated by the heat exchange in the rectifier 305 to enter the absorber 304; a GAX-absorber/generator 309 formed in the absorber 304 to have heat exchange occur between the strong solution flowing in the second pipe 316 and the weak solution flowing from the generator 301 into the absorber 304; a third pipe 317 allowing a part of the strong solution flowing in the first pipe 315 and heated by the heat exchange in the rectifier 305 to go into the absorber 304; a solution cooling absorber 308 formed in the absorber 304 to have a heat exchange occur between the strong solution flowing in the third pipe 317 and the weak solution cooled by the heat exchange in the GAX-absorber/generator 309; a water cooling absorber 307 formed in the bottom of the absorber 304 to have a cold water flow undergo a heat exchange with the ascending coolant vapor flowing from the evaporizer 303 into the absorber 304; a fourth pipe 318 allowing the strong solution flowing in the second pipe 316 and heated by the heat exchange in the GAX-absorber/generator 309 to flow into the bottom of an analyzer 306 in the generator 301 and thus have heat exchange with the weak solution produced in the generator 301; a distributer 312-2 for uniformly distributing the strong solution entering the generator 301 through the fourth pipe 318; a fifth pipe 319 allowing the strong solution flowing in the third pipe 317 and heated by the heat exchange in the solution cooling absorber 308 to enter the top of the analyzed 106 in the generator 301 and absorb part of the steam contained in the coolant vapor produced in the generator 301; and a distributer 312-1 allowing the strong solution entering the generator 301 through the fifth pipe 319 to flow uniformly in the generator 301.

The ammonia GAX absorption cycle basically comprises four constituent units, the generator 301, condenser 302, evaporizer 303 and absorber 304.

As shown in FIG. 4, the burner 320 heats the working solution, i.e., a strong solution contained in the generator 301 to produce a coolant vapor and a weak solution. The coolant vapor flows upward and enters the rectifier 305 through the analyzer 306.

The coolant vapor in the rectifier 305 flows through the first pipe 315 by a pumping of the solution pump 311 to have heat exchange with the strong solution generated in the absorber 304 and flowing into the rectifier 305. Steam contained in the coolant vapor is condensed through the heat exchange between the coolant vapor and the strong solution in the rectifier, thereby rectifying the coolant vapor into highly concentrated coolant vapor.

The weak solution produced in the generator 301 has a specific gravity larger than that of the strong solution and thus flows down to the bottom of the generator 301. It flows in the weak solution coil 314 by a pressure difference between a high-pressure unit, i.e., the generator 301 and a low-pressure unit, i.e., the absorber 304.

The weak solution flowing in the weak solution coil 314 is expanded in the expansion valve 313 and flows into the absorber 304. Falling in drops on the distributer 312-3 formed in the top of the absorber 304, the weak solution is distributed uniformly in the absorber 304 by the distributer 312-3.

The highly concentrated coolant vapor rectified in the rectifier 305 flows into the condenser 302 to have heat exchange with the cooling water flowing from the outdoor air into the condenser 302. The cooling water in the condenser 302 absorbs the heat of condensation generated during the condensation of the coolant vapor in the condenser 302.

The liquid coolant condensed in the condenser 302 is expanded in the expansion valve 313'. After the pressure drops to a saturated vapor pressure between 4 and 6 bar, the liquid coolant flows into the evaporizer 303 and vaporizes into coolant vapor again through heat exchange with the cooling water. The cooling water is cooled by the latent heat of vaporization to cool the indoor air.

The coolant vapor vaporized in the evaporizer 303 enters the coolant heat exchanger 310 to have heat exchange with a liquid coolant condensed in the condenser 302. The liquid coolant is then cooled down nearly to a vaporizing temperature in the evaporizer 303. The coolant vapor is heated up to the a saturating temperature of the absorber 304. This accelerates the absorption and efficiently vaporizes even a small amount of the coolant which is not completely vaporized in the evaporizer 303.

After heat exchange in the coolant heat exchange 310, the coolant vapor vaporized in the evaporizer 303 flows into the absorber 304. The coolant vapor heated in the absorber 304 is cooled in the water cooling absorber 307 through heat exchange with cooling water and absorbed by the weak solution produced in the generator 301, and flows into the absorber 304. The weak solution is then converted into a strong solution as thick as the strong solution originally produced in the generator 301.

The strong solution flowing in the GAX-absorber/generator and the solution cooling absorber 308 is heated by the heat of absorption generated when the weak solution absorbs the coolant vapor in the absorber 304.

The strong solution produced in the absorber 304 gathers in the bottom of the absorber 304 and flows into the high-pressure unit, generator 301 by the operation of the solution pump 311. Passing through the first pipe 315, the strong solution enters the rectifier 305 to have heat exchange with the coolant vapor produced in the generator 301, thereby condensing the steam contained in the coolant vapor add rectifying it into a highly concentrated coolant vapor.

The strong solution is heated by the latent heat of condensation of the coolant vapor and the line heat which is the temperature difference between the strong solution and coolant vapor.

The strong solution flowing in the first pipe 315 and heated in the rectifier 305 basses through the second pipe 316, entering the GAX-absorber/generator 309. Flowing in the GAX-absorber/generator 309, it is heated by heat exchange with the weak solution produced in the generator 301 and flowing into the top of the absorber 304 through the weak solution coil 314.

The strong solution then flows in the fourth pipe 318 in a liquid-to-vapor transition state and enters the bottom the analyzer 306, so that it is distributed uniformly in the generator 301 by the distributer 312-2 to have heat exchange with the weak solution flowing in the weak solution coil 314.

Flowing in the third pipe 317 divided from the first pipe 315 to allow part of the strong solution to flow thereinto by pumping the solution punk 311, the strong solution in the solution cooling absorber 308 absorbs heat from the weak solution cooled by heat exchange with the GAX-absorber/generator 309.

The strong solution enters the top of the analyzer 306 in the generator 301 through the fifth pipe 319 and flows uniformly in the generator by the distributer 312-1, thereby absorbing a part of the steam contained in the coolant vapor produced in the generator 301 and partly rectifying the steam. It moves down the bottom of the generator 301.

A succession of such operations as described above cycle in a state of equilibrium during the operation of the system.

Figure 5:
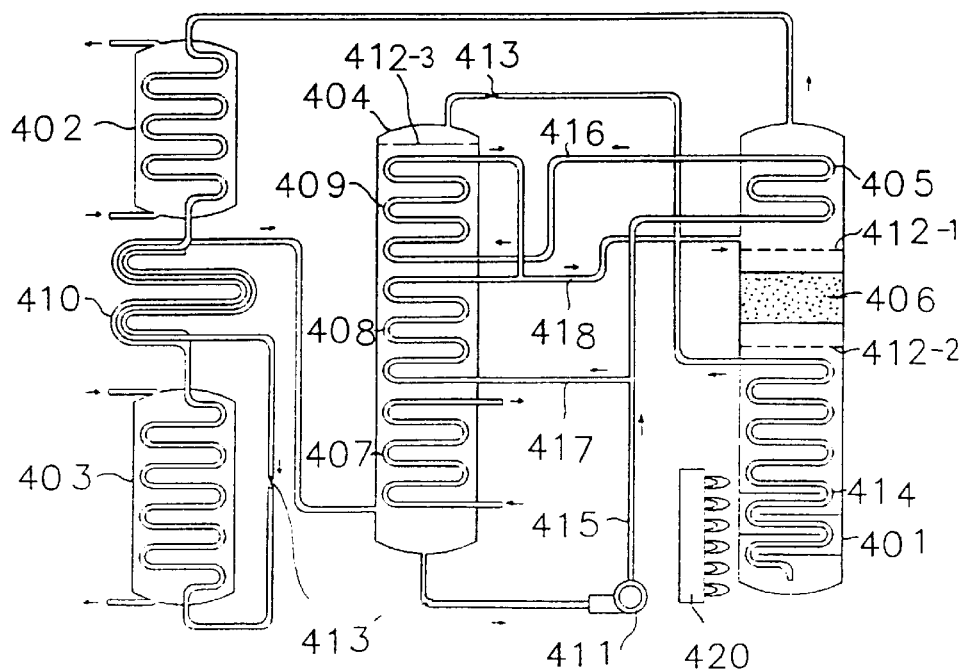
FIG. 5 is a schematic of an ammonia GAX absorption cycle in accordance yet another preferred embodiment of the present invention.

FIG. 5 is a schematic of an ammonia GAX absorption cycle according to a third preferred embodiment of the present invention.

Referring to FIG. 5, the ammonia GAX absorption cycle comprises a generator 401 for boiling a coolant, i.e., ammonia in a concentrated aqueous ammonia solution (strong solution) by using a burner 420 to produce an ammonia coolant vapor and a diluted aqueous ammonia solution (weak solution); a rectifier 405 for condensing the water vaporized with the coolant vapor produced in the generator 401 to rectify it into a highly concentrated ammonia coolant vapor; a condenser 402 for condensing the coolant vapor flowing from the generator 401 into a liquid coolant by using the cooling water cooled by an outdoor air; an evaporizer 403 for vaporizing the liquid coolant condensed in the condenser 402 into a coolant vapor again by the cooling water heated by an indoor air during a cooling, an expansion valve 413' for expanding the liquid coolant flowing from the condenser 402 to the evaporizer 403; a coolant heat exchanger 410 allowing heat exchange between the liquid coolant condensed in the condenser 402 and the coolant vapor vaporized in the evaporizer 403; an absorber 404 permitting the weak solution transferred from the generator 401 to absorb the coolant vapor vaporized in the evaporizer 403, thereby producing a strong solution as thick as the strong solution initially generated in the generator 401; a weak solution coil 414 formed in the generator 401 to transfer the weak solution produced in the generator 401 to the absorber 404; an expansion valve 413 for expanding the weak solution flowing from the generator 401 into the absorber 404; a distributer 412-3 formed in the top of the absorber 404 so as to allow the weak solution expanded by the expansion valve 413 to flow uniformly in the absorber 404; a solution pump 411 for pumping the strong solution generated in the absorber 404 towards the generator 401; a first pipe 415 allowing the strong solution generated in the absorber to pass through the rectifier 405 by means of a pumping of the solution pump 411 and have heat exchange with the coolant vapor in the rectifier 405 so as to rectify the coolant vapor into a highly concentrated coolant vapor; a second pipe 416 allowing part of the strong solution flowing in the first pipe 415 and heated by the heat exchange in the rectifier 405 to enter the absorber 404; a GAX-absorber/generator 409 formed in the absorber 404 to have heat exchange occur between the strong solution flowing in the second pipe 416 and the weak solution flowing from the generator 401 into the absorber 404; a third pipe 417 allowing a part of the strong solution flowing in the first pipe 415 and heated by the heat exchange in the rectifier 405 to go into the absorber 404; a solution cooling absorber 408 formed in the absorber 404 to have heat exchange occur between the strong solution flowing in the third pipe 417 and the weak solution cooled by the heat exchange in the GAX-absorber/generator 409; a water cooling absorber 407 formed in the bottom of the absorber 404 to have a cold water flow undergo a heat exchange with the ascending coolant vapor flowing from the evaporizer 403 into the absorber 404; a fourth pipe 416 allowing the strong solution flowing in the second pipe 416 and heated by the heat exchange in the GAX-absorber/generator 409 to be combined with the strong solution flowing in the third pipe 417 and heated by the heat exchange in the solution cooling absorber 408, thereby absorbing part of the steam contained in the coolant vapor produced in the generator and partly rectifying the steam, the strong solution entering the top of an analyzer 406 in the generator 401 and have a heat exchange with the weak solution produced in the generator 401; a distributer 412-1 for uniformly distributing the strong solution entering the generator 201 through the fourth pipe 418; and a distributer 412-2 for uniformly distributing the strong solution passing through the analyzer 406 after dispersed by the distributer 412-1 to cause the bottom of the analyzer 406 to have active heat exchange between the strong solution and the weak solution produced in the generator 401 and flowing in the weak solution coil 414.

The ammonia GAX absorption cycle basically comprises four constituent units, the generator 401, condenser 402, evaporator 403 and absorber 404.

As shown in FIG. 5, the burner 420 heats the working solution, i.e., a strong solution contained in the generator 401 to produce a coolant vapor and a weak solution. The coolant vapor flows upward and enters the rectifier 405 through the analyzer 406.

The coolant vapor in the rectifier 405 flows through the first pipe 415 by a pumping of the solution pump 411 to have heat exchange with the strong solution generated in the absorber 404 and flowing into the rectifier 405. The steam contained in the coolant vapor is condensed through heat exchange between the coolant vapor and the strong solution in the rectifier, thereby rectifying the coolant vapor into highly a concentrated coolant vapor.

The weak solution produced in the generator 401 has a specific gravity larger than the strong solution and thus flows down to the bottom of the generator 401. It flows in the weak solution coil 414 by means of a pressure difference between a high-pressure unit, i.e., the generator 401 and a low-pressure unit, i.e., absorber 404.

The weak solution flowing in the weak solution coil 414 is expanded in the expansion valve 413 and flows into the absorber 404. Falling in drops on the distributer 412-3 formed in the top of the absorber 404, the weak solution is distributed uniformly in the absorber 404 by the distributer 412-3.

The highly concentrated coolant vapor rectified in the rectifier 405 flows into the condenser 402 to have heat exchange with the cooling water flowing from the outdoor air into the condenser 402. The cooling water in the condenser 402 absorbs the heat of condensation generated during the condensation of the coolant vapor in the condenser 402.

The liquid coolant condensed in the condenser 402 is expanded in the expansion valve 413'. After the pressure drops to a saturated vapor pressure between 4 and 6 bar, the liquid coolant flows into the evaporizer 403 and vaporizes into coolant vapor again through heat exchange with the cooling water. The cooling water is cooled by the latent heat of vaporization to cool the indoor air.

The coolant vapor vaporized in the evaporizer 403 enters the coolant heat exchanger 410 to have heat exchange with a liquid coolant condensed in the condenser 402. The liquid coolant is then cooled down nearly to a vaporizing temperature in the evaporizer 403. The coolant vapor is heated up to a saturating temperature of the absorber 404. This accelerates the absorption and efficiently vaporizes even a small amount of the coolant that is not completely vaporized in the evaporizer 403.

After the heat exchange in the coolant heat exchanger 410, the coolant vapor vaporized in the evaporizer 403 flows into the absorber 404. The coolant vapor heated in the absorber 404 is cooled in the water cooling absorber 407 through heat exchange with the cooling water and absorbed by the weak solution produced in the generator 401, and flows into the absorber 404. The weak solution is then converted into a strong solution as thick as the strong solution originally produced in the generator 401.

The strong solution flowing in the GAX-absorber/generator 409 and the solution cooling absorber 408 is heated by the heat of absorption generated when the weak solution absorbs the coolant vapor in the absorber 404.

The strong solution produced in the absorber 404 gathers in the bottom of the absorber 404 and flows into the high-pressure unit, generator 401 by the operation of the solution pump 411. Passing through the first pipe 415, the strong solution enters the rectifier 405 to have heat exchange with the coolant vapor produced in the generator 401, thereby condensing the steam contained in the coolant vapor and rectifying it into a highly concentrated coolant vapor.

The strong solution is heated by the latent heat of condensation of the coolant vapor and the line heat which is the temperature difference between the strong solution and coolant vapor.

The strong solution flowing in the first pipe 415 and heated in the rectifier 40 passes through the second pipe 416, entering the GAX-absorber/generator 409. Flowing in the GAX-absorber/generator 409, it is heated by heat exchange with the weak solution produced in the generator 401 and flowing into the top of the absorber 404 through the weak solution coil 414.

Flowing in the third pipe 417 divided from the first pipe 415 to allow a part of the strong solution to flow there into by a pumping of the solution pump 411, the strong solution in the solution cooling absorber 408 absorbs heat from the weak solution cooled by a heat exchange with the GAX-absorber/generator 409.

When flowing in the GAX-absorber/generator 409 and solution cooling absorber 408, the strong solution undergoes heat exchange with the weak solution produced in the generator 401 and flowing into the absorber 101, forming a liquid-to-vapor transition state. The strong solution flowing in the GAX-absorber/generator 409 is combined with that in the 408.

The strong solution combined enters the top of the analyzer 406 in the generator 401 through the fourth pipe 418 and flows uniformly in the generator 401 by the distributer 412-1, thereby absorbing part of the steam contained in the coolant vapor produced in the generator 401 and partly rectifying the steam. It is dripped on the distributor 412-2 through the analyzer 406.

Falling in drops on the distributer 412-2, the strong solution is dispersed uniformly in the generator to have heat exchange with the weak solution produced in the generator and flowing in the weak solution coil 414, descending in the bottom of the generator 401.

A succession of such operations as described above cycle in a state of equilibrium during the operation of the system.

As described above, the strong solution entering the rectifier from the absorber flows in the first pipe to have heat exchange with the coolant vapor entering the rectifier from the absorber and generate highly concentrated coolant vapor. The strong solution heated in the rectifier undergoes heat exchange with the weak solution entering the rectifier from the absorber and the coolant vapor entering the absorber from the evaporizer, thereby providing an active absorption of the coolant vapor to easily supply a strong solution in the absorber.

Since the strong solution produced in the absorber is used in the rectifier, the cycle has a simple but a low cost construction in that it requires no separate cooling water line in the rectifier and utilizes the heat of condensation generated during the rectification.

The heat transfer circuit, as embodied herein, is constructed in a manner that the hot solution in the absorber is transferred to a high temperature unit (i.e., bottom of the analyzer) but the cold solution in the absorber is carried to a low temperature unit (i.e., top of the analyzer), thereby reducing the quantity of heat entering the ammonia GAX absorption cycle to provide a significant enhancement in the coefficient of performance of the cycle.

It will be apparent to those skilled in the art that various modifications and variations can be made in the ammonia GAX absorption cycle of the present invention without departing from the spirit or scope of the invention. Thus, it is intended that the present invention cover the modification and variations of this invention provided they come within the scope of the appended claims and their equivalents.

What is claimed is:

1. An ammonia GAX (Generator Absorber Heat Exchanger) absorption cycle, comprising:

an absorber having a solution cooling absorber and a GAX absorber for producing a strong solution;

a generator for generating a weak solution and a coolant vapor;

a rectifier for heating said coolant vapor to rectify it;

a first pipe for passing at least part of said strong solution through the rectifier to rectify said coolant vapor into a highly concentrated coolant vapor;

a second pipe for passing said at least part of the strong solution passed from the first pipe and heated in the rectifier into the GAX absorber of said absorber for providing heat exchange with said weak solution from the generator;

a third pipe for passing said at least part of the strong solution passed from the first pipe and heated in the rectifier to the solution cooling absorber of said absorber for providing heat exchange with said weak solution; and means for passing said at least part of the strong solution passed from the second and third pipes and heated in the rectifier to said generator for providing heat exchange with said coolant vapor and said weak solution produced in the generator, wherein said passing means includes means for combining said at least part of the strong solution passed from the second pipe with that passed from the third pipe to absorb at least part of steam in said coolant vapor and at least partly rectifying the steam.

2. The ammonia GAX absorption cycle of claim 1, wherein said passing means comprises:

a fourth pipe for passing said at least part of the strong solution passed from the second pipe to the generator for providing heat exchange with said weak solution; and a fifth pipe for passing said at least part of the strong solution passed from the third pipe to the generator to absorb at least part of steam in said coolant vapor and at least partly rectify the steam.

3. An ammonia GAX (Generator Absorber Heat Exchanger) absorption cycle, comprising:

a first pipe for passing a strong solution generated in an absorber to a rectifier to rectify a coolant vapor into a highly concentrated coolant vapor, said coolant vapor provided from a generator into the rectifier;

a second pipe for passing the strong solution passed from the first pipe to said absorber for providing heat exchange with a weak solution provided from said generator;

a third pipe for passing at least part of the strong solution to said absorber for providing heat exchange with said weak solution; and means for passing the strong solution passed from the second and third pipes to the generator for providing heat exchange with said coolant vapor and said weak solution, wherein said passing means comprises a fourth pipe for combining the strong solution passed from the second pipe with that passed from the third pipe to absorb at least part of steam in said coolant vapor in the generator and at least partly rectifying the steam, said fourth pipe passing the strong solution to the generator for providing heat exchange with said weak solution.

4. The ammonia GAX absorption cycle of claim 3, wherein said passing means comprises:

a fourth pipe for passing the strong solution passed from the second pipe to the generator for providing heat exchange with said weak solution; and a fifth pipe for passing the strong solution passed from the third pipe to the generator to absorb at least part of steam in said coolant vapor and partly rectify the steam.

* * * * *